United States Patent
Pickens (10) Patent No.: US 9,162,279 B1
(45) Date of Patent: Oct. 20, 2015

(54) SOLID TO GAS PHASE CHANGE MATERIAL FOR ADDITIVE MANUFACTURING

(71) Applicant: MADESOLID, INC., Emeryville, CA (US)

(72) Inventor: Lance Robert Pickens, Berkeley, CA (US)

(73) Assignee: MADESOLID, INC., Emeryville, CA (US)

( * ) Notice: Subject to any disclaimer, the term of this patent is extended or adjusted under 35 U.S.C. 154(b) by 0 days.

(21) Appl. No.: 14/632,214

(22) Filed: Feb. 26, 2015

(51) Int. Cl.
| | |
|---|---|
| *B22C 7/02* | (2006.01) |
| *B22C 9/04* | (2006.01) |
| *B22C 9/00* | (2006.01) |
| *B22C 17/00* | (2006.01) |
| *B33Y 10/00* | (2015.01) |
| *B33Y 30/00* | (2015.01) |

(52) U.S. Cl.
CPC . *B22C 7/02* (2013.01); *B22C 7/023* (2013.01); *B22C 9/00* (2013.01); *B22C 9/04* (2013.01); *B22C 9/043* (2013.01); *B22C 17/00* (2013.01); *B33Y 10/00* (2014.12); *B33Y 30/00* (2014.12)

(58) Field of Classification Search
CPC ........... B22C 7/02; B22C 7/023; B22C 9/04; B22C 9/043
USPC .............. 164/34, 45, 235, 246, 361, 516–519
See application file for complete search history.

(56) References Cited

U.S. PATENT DOCUMENTS

| | | | | |
|---|---|---|---|---|
| 3,857,435 | A * | 12/1974 | Burkert et al. | 164/36 |
| 5,833,914 | A * | 11/1998 | Kawaguchi | 264/400 |
| 5,853,044 | A * | 12/1998 | Wheaton et al. | 164/516 |
| 7,270,166 | B2 * | 9/2007 | Jakus et al. | 164/45 |
| 7,287,571 | B2 * | 10/2007 | Cossey | 164/34 |
| 7,900,685 | B2 * | 3/2011 | Bolton | 164/35 |
| 2013/0220570 | A1 * | 8/2013 | Sears et al. | 164/34 |
| 2014/0190650 | A1 * | 7/2014 | McGuire et al. | 164/34 |

* cited by examiner

*Primary Examiner* — Kevin E Yoon
(74) *Attorney, Agent, or Firm* — Pillsbury Winthrop Shaw Pittman LLP (57) ABSTRACT

The present disclosure relates to a system for fabricating a mold positive via additive manufacturing to form a casting mold. The mold positive material may have a first portion that undergoes a solid to gas phase transformation at a first temperature and a second portion that undergoes a solid to gas phase transformation at a second temperature. The first portion may be formed within the second portion, and the first temperature may be low relative to the second temperature. The first portion of the mold positive may thermally decompose at a lower temperature than the second portion, which may create voids within the mold positive so that during the higher temperature combustion of the second portion of the material, the second portion may expand into the newly empty spaces instead of into a ceramic casting mold. This may greatly reduce stress on the casting mold.

24 Claims, 4 Drawing Sheets

SOLID TO GAS PHASE CHANGE MATERIAL FOR ADDITIVE MANUFACTURING

FIELD

This disclosure relates to a system and method for using a mold positive fabricated from a solid to gas phase change material via additive manufacturing to form a casting mold.

BACKGROUND

Investment (also called lost-wax) casting is known. Investment and/or lost-wax casting is a process by which a ceramic mold is formed around a mold positive and then the mold positive is removed, leaving the ceramic mold empty and ready for molding. Molten metal, for example, may then be poured into the ceramic mold to fill the empty spaces left over after removal of the mold positive. The mold positive is usually molded itself and/or carved by hand from a wax block. Typically, the mold positive is made from wax because it is easily melted out of the ceramic mold at elevated temperatures. Photopolymers are not typically used for mold positives for investment casting because they are heavily cross-linked and are not easily removed from a ceramic mold.

SUMMARY

This disclosure relates to a system and method for using a mold positive to form a casting mold. The method comprises forming the mold positive using an additive manufacturing device, fabricating the casting mold around the mold positive, and removing the mold positive from the casting mold by increasing a temperature of the mold positive and the casting mold. The mold positive may be formed from a material having a first portion that undergoes a solid to gas phase transformation at a first temperature and a second portion that undergoes a solid to gas phase transformation at a second temperature. The first portion may be formed within the second portion. The first temperature may be low relative to the second temperature. The temperature of the mold positive and the casting mold may be increased from below the first temperature to above the second temperature such that the first portion undergoes the solid to gas phase transformation at the first temperature and forms voids in the second portion. The voids may facilitate expansion of the second portion without damaging the casting mold. The second portion may expand as the temperature increases and then undergo the solid to gas phase transformation at the second temperature, leaving the casting mold empty and ready for casting.

In some implementations, the first portion and the second portion are configured such that undergoing the solid to gas phase transformation includes thermally decomposing into one or more of $CO_2$, $H_2O$, Ammonia, and/or other components. In some implementations, the first portion is one or both of an additive and/or a filler. In some implementations, the first portion and the second portion are formed with a quantity of double bonds that facilitates reduced soot production and/or complete combustion during the solid to gas phase transformation. In some implementations, the first portion and the second portion lack metallic elements. In some implementations, the first portion and the second portion include oxygen that forms hydroxyl radicals during the solid to gas phase transformation to facilitate substantially complete combustion of the first portion and the second portion in the absence of externally supplied oxygen. In some implementations, the first portion includes urea and the first temperature is about 180° C. In some implementations, the first portion includes isocyanurate and the first temperature is about 320° C. In some implementations, the second portion includes one or more of polyethylene glycol, a polyester based monomer, PEG400, or PEG200. In some implementations, the second portion has a ratio of carbon to oxygen of 2n:n+1. In some implementations, one or both of the first portion or the second portion may include one or more of a pigment or a dye to control light behavior during additive manufacturing photopolymerization to moderate cure depth and cure rate. In some implementations, one or both of the first portion or the second portion may include a burn rate accelerator, such as ferrocene derivatives and/or other thermal decomposition catalysts such as the antiknock agents commonly employed to prevent engine knock. In some implementations, one or both of the first portion or the second portion may include compounds which undergo thermal decomposition such as urea or urea derivatives, or alkyl carbonates such as ethylene or propylene carbonates, and/or other compounds.

The present system includes one or more of an additive manufacturing device, a casting mold fabrication device, a controller, a user interface, electronic storage, external resources, and/or other components. The additive manufacturing device may be configured to produce polymer objects by additive manufacturing. The additive manufacturing device may perform a layer by layer three dimensional object formation process wherein exposure to ultraviolet (UV) light cures (solidifies) a photopolymer resin and adheres the cured photopolymer resin to a previously solidified layer below. The casting mold fabrication device may be configured to facilitate fabricating the casting mold around the mold positive. In some implementations, fabrication of the casting mold around the mold positive may be performed by a user using the casting mold fabrication device and/or other equipment (e.g., external resources). The controller may be configured to control the additive manufacturing device, one or more components of the casting mold fabrication device, and/or other components of the present system. The controller may be configured to control the additive manufacturing device, the casting mold fabrication device, and/or other components of the present system to generate the mold positive, the casting mold, and/or other objects.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
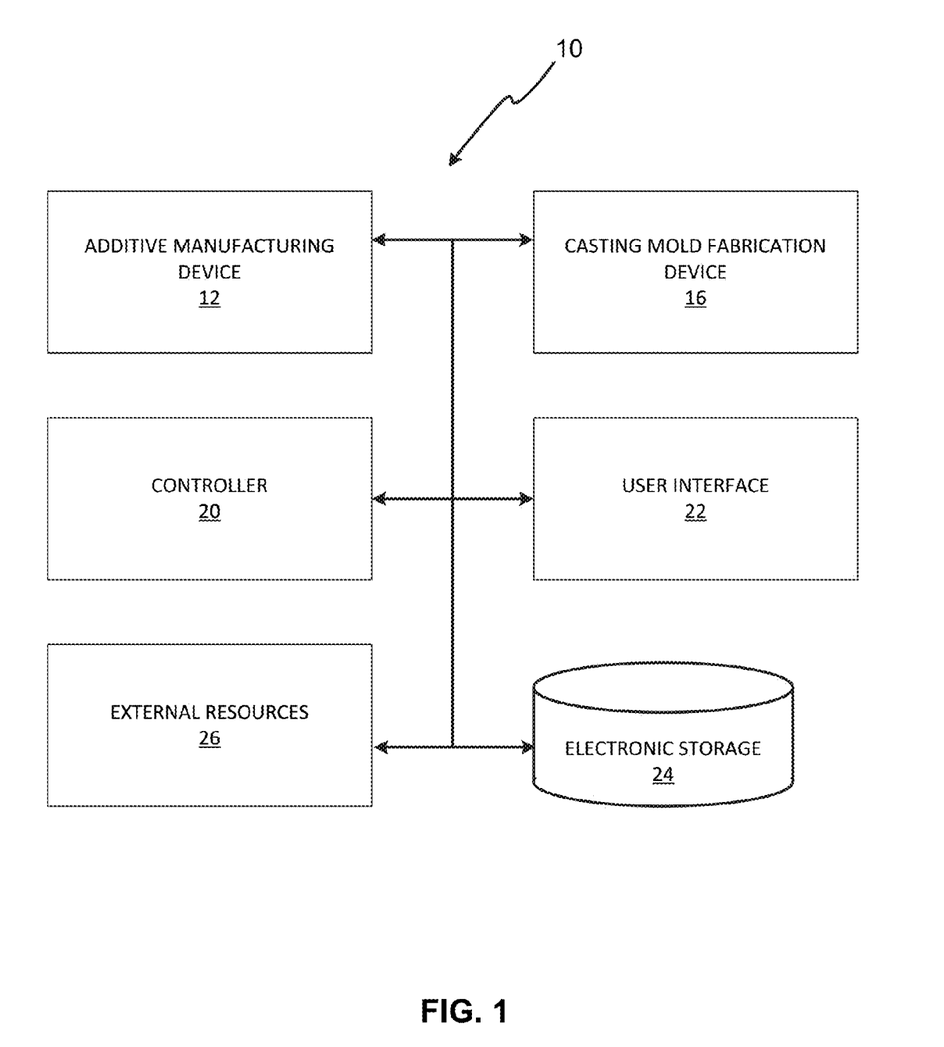
FIG. 1 illustrates a system configured to use a mold positive fabricated from a solid to gas phase change material via additive manufacturing to form a casting mold.

FIG. 1 illustrates a system 10 for fabricating a mold positive from a solid to gas phase change material via additive manufacturing (e.g., three dimensional printing) to form a casting mold. Three dimensional printing may operate as a bridge between digital fabrication and traditional investment casting by facilitating generation of a mold positive using a three dimensional printer instead of, for example, hand carving and/or molding a mold positive from wax. Currently, most photopolymer systems and/or other materials used in three dimensional printing do not lend themselves to investment casting mold positive fabrication due to the crosslinking nature of the photopolymer during the polymerization process. Typically, a phase changing material that melts away at elevated temperatures (e.g., wax and/or other thermoplastics which are not used for three dimensional printing) are used to create a mold positive for investment casting. System 10 facilitates production of a mold positive using three dimensional printing from a material that thermally decomposes into one or more gases and/or other components with increasing temperature.

It is known that materials tend to expand when heated. Typical three dimensional printed parts made using photopolymers are cross-linked at a molecular level and tend not to have a melting point. Instead, they may be burned away at very high temperatures. This burning away means that often the typical investment casting mold material, such as a ceramic and/or other brittle refractory compounds, will crack due to the expansion of the mold positive material as the temperature is increased. Sometimes incomplete combustion of the mold positive material results due to a heavily cross-linked monomer, which leaves behind carbon deposits, if the mold positive material burns at all, and renders the casting mold unusable. Mold positives for investment casting are not typically produced using three dimensional printing and/or other additive manufacturing techniques because of these disadvantages.

System 10 overcomes these and/or other thermal expansion and combustion disadvantages by facilitating fabrication of a mold positive from a two phase material. The mold positive material of system 10 may have a first portion (e.g., an additive, a filler, etc.) that undergoes a solid to gas phase transformation at a first temperature and a second portion that undergoes a solid to gas phase transformation at a second temperature. The first portion may be formed within the second portion, and the first temperature may be low relative to the second temperature. The first portion of the mold positive may thermally decompose into gas at a lower temperature than the second portion, which may create voids within the mold positive so that during the higher temperature combustion of the second portion of the material, the second portion may expand into the newly empty spaces instead of into the ceramic casting mold. This may greatly reduce stress on the casting mold.

Additionally, to reduce and/or eliminate carbon and/or other deposits left behind on the casting mold after the solid to gas phase change, the mold positive material of system 10 may be formed without metallic elements and with a relatively low number of double bonds compared to typical three dimensionally printed materials. In some implementations, system 10 may include an additive manufacturing device 12, a casting mold fabrication device 16, a controller 20, a user interface 22, electronic storage 24, external resources 26, and/or other components.

Additive manufacturing device 12 may be configured to produce polymer objects by additive manufacturing. Additive manufacturing device 12 may perform a layer by layer three dimensional object formation process wherein exposure to ultraviolet (UV) light cures (solidifies) a photopolymer resin and adheres the cured photopolymer resin to a previously solidified layer below. Additive manufacturing device 12 may include one or more of a motor, a valve, a piston, a stage and/or tray, electronic control circuitry, wiring, a housing, a frame, a light source, a scanner, a mixer including a reservoir configured to hold a photopolymer mixture, a mixing blade, a display, a control pad, a heater, a sensor, and/or other components that allow additive manufacturing device 12 to function as described herein. In some implementations, additive manufacturing device 12 may be configured to communicate with casting mold fabrication device 16, controller 20, user interface 22, external resources 26, electronic storage 24, and/or other components of system 10 wirelessly (e.g., via a wireless communication network such as the internet) and/or via wires. For example, additive manufacturing device 12 may include a transceiver and/or other communication components configured to facilitate wireless communication between additive manufacturing device 12 and other components of system 10.

In some implementations, additive manufacturing device 12 may be configured to produce polymer objects such as mold positives for investment casting, and/or other objects. As described above, in some implementations, the mold positive may be fabricated from one or more materials that facilitate removal of the mold positives (e.g., with increased temperature) from casting molds during investment casting. In some implementations, a given mold positive may be formed from a material having a first portion that undergoes a solid to gas phase transformation at a first temperature and a second portion that undergoes a solid to gas phase transformation at a second temperature. The first portion may be formed within the second portion. In some implementations, being formed within the second portion may include being suspended within the second portion, dispersed throughout the second portion, and/or other formations. In some implementations, the first portion may be and/or include multiple particles of various sizes and/or shapes. The first portion may be dispersed throughout a matrix formed by the second portion. In some implementations, the first portion may be and/or include one or more of an additive, filler, and/or other components.

Figure 2A:
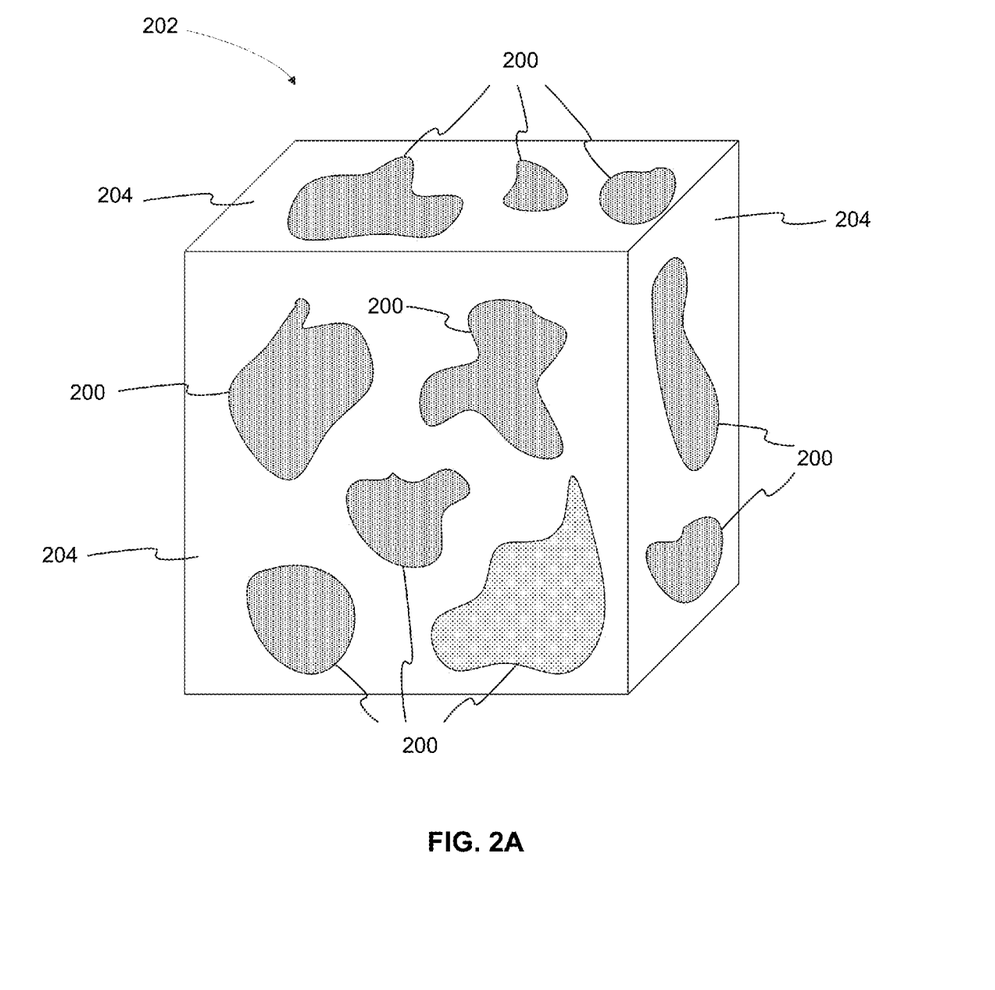
FIG. 2A illustrates a first portion of a mold positive material dispersed within a second portion of the mold positive material.

By way of a non-limiting example, FIG. 2A illustrates a first portion 200 of the mold positive material 202 dispersed within a second portion 204 of mold positive material 202. First portion 200 may be a material that undergoes a solid to gas phase transformation at a first temperature and second portion 204 may undergo a solid to gas phase transformation at a second temperature that is higher than the first temperature. As shown in FIG. 2A, first portion 200 is formed by multiple particles of various sizes and/or shapes within (e.g., dispersed, suspended within, etc.) second portion 204. As described herein, first portion 200 may undergo a solid to gas phase transformation at a lower temperature than second portion 204, thereby forming voids in second portion 204. The voids may facilitate expansion of second portion 204. Second portion 204 may expand as its temperature increases and then undergo a solid to gas phase transformation at the second higher temperature, for example.

Returning to FIG. 1, in some implementations, the first portion and/or the second portion of the mold positive material may lack metallic elements. The mold positive material of system 10 may be formed without metallic elements and/or with a relatively low number of double bonds compared to typical three dimensionally printed materials to reduce and/or eliminate carbon and/or other deposits (e.g., ash) left behind on the casting mold after the solid to gas phase change.

For example, typical three dimensionally printed materials may have about 1% by weight percentage or more double bonds. Typically, aromatic and other ring structures confer strength and are generally favorable as backbone structures. In the case of burn out these structures impair clean burnout and create undesirable ash content (e.g., inappropriate monomers and/or compounds that would not be used in the first portion or the second portion may include isobornyl acrylate, tricyclododecane diacrylate, bisphenol-A diacrylate, 2-hydroxy-3-phenoxypropyl acrylate) double bonds. Typical three dimensionally printed materials may include metallic and/or semi-metallic elements such as titanium (titanium dioxide pigment), aluminum, silicon, copper, iron, calcium, and/or magnesium.

The mold positive material of system 10 may have about 1 weight % of double bonds or greater, both as unreacted monomer, which while unreacted contains at least two double bonds in acrylates and methacrylates, so the number of double bonds may be well over 40% if not completely reacted. However, since the decomposition of acrylates and methacrylates involves reversion to monomer state at elevated temperature, it is the side chains or backbone that may contain the aromatic or alicyclic rings that contribute to soot. In some implementations, the first portion may include urea, isocyanurate, and/or other components such alkyl carbonates. In some implementations, the second portion may include one or more of polyethylene glycol, a polyester based monomer, PEG400, PEG200, and/or other components. In some implementations, the second portion may have a ratio of carbon to oxygen of 2n:n+1, and/or other ratios.

In some implementations, one or both of the first portion or the second portion may include a burn rate accelerator, such as ferrocene derivatives and/or other thermal decomposition catalysts such as the antiknock agents commonly employed to prevent engine knock. In some implementations, one or both of the first portion or the second portion may include compounds which undergo thermal decomposition such as urea or urea derivatives, or alkyl carbonates such as ethylene or propylene carbonates, and/or other compounds.

In some implementations, one or both of the first portion or the second portion may include one or more of a pigment or a dye to control light behavior during additive manufacturing photopolymerization to moderate cure depth, cure rate, and/or other material properties, for example. Such compounds are commonly inorganic metal oxides, metal-organic complexes such as phthalocyanin, and/or large bulky polyaromatic compounds such as perylenes. However, these compound classes may lead to formation of ash and/or inhibit combustion of the mold positive and are not included in the mold positive material of system 10. The mold positive material of system 10 may include any pigment and/or dye that absorbs light in a competitive manner according to the UV-vis spectra of the photo initiator compound and is free of metallic elements (e.g., a low ash generating component), and/or low levels of such metal containing compounds such that the weight percentage is less than about 0.1%. For photopolymer systems working in the near-UV part of the spectrum (e.g., about 405 nm), the class of appropriate dyes to limit the penetration of light will be classed as yellow-green, absorbing between about 400-435 nm and/or also as blue having about a 435 nm to about a 480 nm peak absorbance. Classes of dyes that are metal-free and commonly employed include Azo dyes such as Tartarazine, Quinoline Yellow, Sudan Yellow 3G, and/or other dyes, for example.

In some implementations, undergoing the solid to gas phase change may be and/or include thermally decomposing into one or more gases and/or other elements such as $CO_2$, $H_2O$, ammonia, and/or other gases and/or elements. In some implementations, thermally decomposing may be and/or include breakage of chemical bonds. As described above, thermal decomposition of the first portion of the system 10 mold positive material may occur at a lower temperature compared to thermal decomposition of the second portion of the system 10 mold positive material. For example, in some implementations, thermal decomposition of the first portion may occur at a first temperature between about 150° C. and about 350° C. In some implementations, the first temperature is about 180° C. In some implementations, the first temperature is about 320° C. In some implementations, thermal decomposition of the second portion may occur at a second temperature between about 250° C. and about 450° C. In some implementations, the second temperature may be about 250° C. In some implementations, the second temperature may be about 450° C. These temperatures may be typical for mold positive removal from a casting mold during investment casting, for example.

Casting mold fabrication device 16 may be configured to facilitate fabricating the casting mold around the mold positive. In some implementations, casting mold fabrication device 16 may include slurry dip tanks, sanders, fluidized beds, saws, hammers, grinders, sanders, controllers and/or associated control software, furnaces, driers, and/or other components configured to facilitate casting mold fabrication around the mold positive. In some implementations, fabrication of the casting mold around the mold positive may be performed by a user using casting mold fabrication device 16 and/or other equipment (e.g., external resources 26). In some implementations, fabricating the casting mold around the mold positive may include dipping the mold positive into a slurry of refractory material (e.g., silica, zircon, aluminum silicates, alumina, etc.), stuccoing the dipped mold positive with ceramic particles, allowing the dipped and stuccoed casting mold to harden, and/or other operations. In some implementations, the casting mold fabrication operations described above may be repeated one or more times to form the casting mold.

In some implementations, the mold positive may be removed from the casting mold by heating the mold positive and the casting mold. The temperature of the mold positive and the casting mold may be increased from below the first temperature to above the second temperature, for example. This heating may cause the first portion to undergo the solid to gas phase transformation at the first temperature, thereby forming voids in the second portion. The voids may facilitate expansion of the second portion without damaging the casting mold. The second portion may expand as the temperature increases and then undergo the solid to gas phase transformation at the second temperature, leaving the casting mold empty and ready for casting. As described above, in some implementations, the first portion and the second portion may thermally decompose into one or more gasses and/or other components, and the low quantity of double bonds may facilitate reduced soot production and/or complete combustion during the solid to gas phase transformation. In some implementations (e.g., since the process of combustion involves oxidation), the first portion and the second portion of the mold positive material include oxygen that forms hydroxyl radicals during the solid to gas phase transformation to facilitate substantially complete combustion of the first portion and the second portion in the absence of externally supplied oxygen.

Figure 2B:
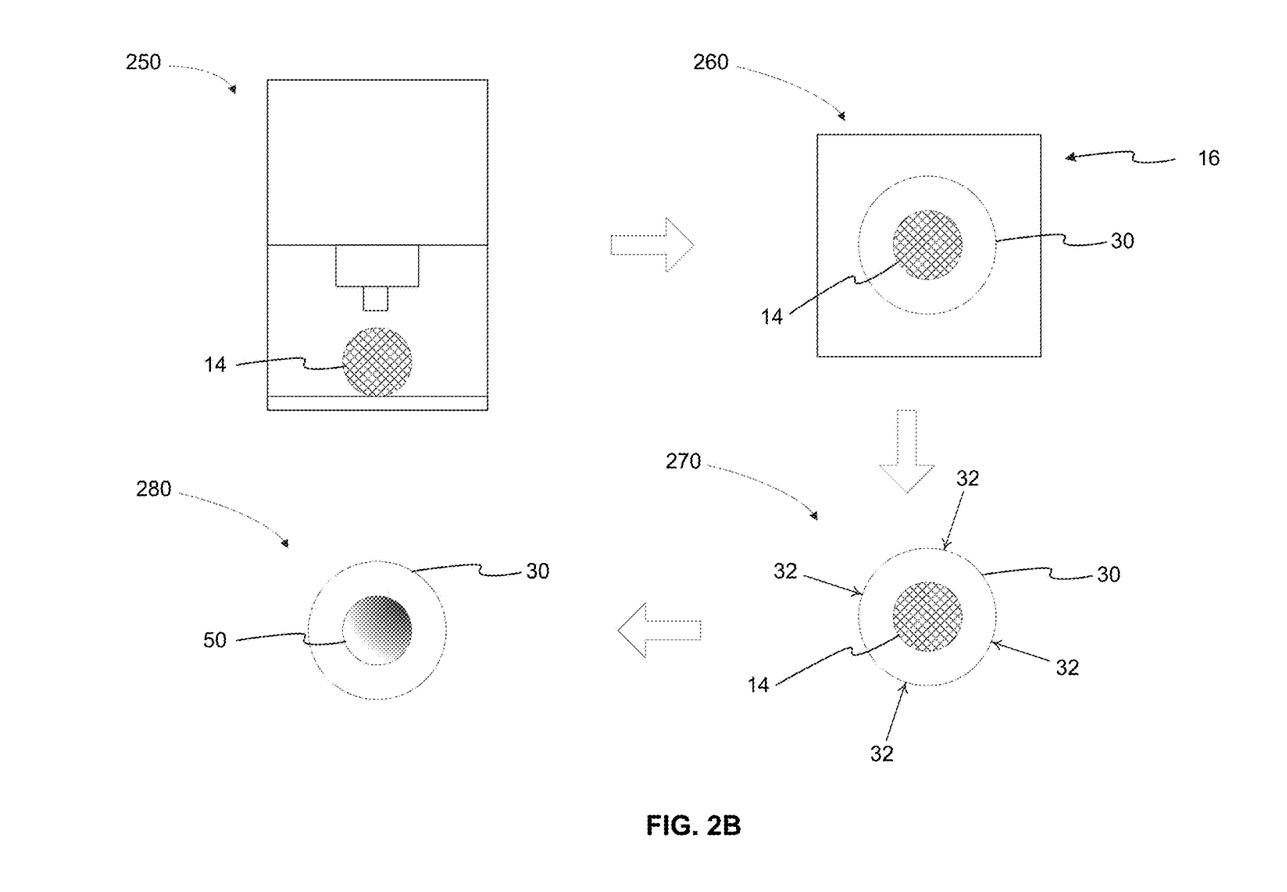
FIG. 2B illustrates an investment casting process using the solid to gas phase change material.

By way of a non-limiting example, FIG. 2B illustrates an example of an investment casting process (operations 250, 260, 270, 280) using the solid to gas phase change material (the mold positive) 14 described herein. At operation 250, mold positive 14 may be formed by additive manufacturing device 12 and/or other components of system 10. At operation 260, casting mold 30 is formed around mold positive 14. Casting mold 30 may be formed by and or using casting mold fabrication device 16, for example. At operation 270, casting mold 30 and mold positive 14 may be heated 32 such that a first portion (e.g., first portion 200 shown in FIG. 2A) of mold positive 14 undergoes the solid to gas phase change and then a second portion (e.g., second portion 204 shown in FIG. 2A) of mold positive 14 undergoes the solid to gas phase change as the temperature increases. The heating may be performed by and/or using casting mold fabrication device 16, for example. As shown in operation 280, after the portions of mold positive 14 have undergone the solid to gas phase change, only casting mold 30 remains. The absence of mold positive 14 may form one or more cavities 50 in casting mold 30, for example.

Returning to FIG. 1, controller 20 may be configured to control additive manufacturing device 12, one or more components of casting mold fabrication device 16, and/or other components of system 10. Controller 20 may be configured to control additive manufacturing device 12, casting mold fabrication device 16, and/or other components of system 10 to generate the mold positive, the casting mold, and/or other objects. Controller 20 may be configured to control additive manufacturing device 12, casting mold fabrication device 16, and/or other components based on output signals from sensors included in external resources 26, information stored in electronic storage 24, information entered and/or selected via user interface 22, and/or other information. Controller 20 may include one or more processors, electrical equipment (e.g., switches, a bus, wiring), valves, and/or other components that allow controller 20 to function as described herein. In some implementations, controller 20 may be configured to communicate with additive manufacturing device 12, casting mold fabrication device 16, user interface 22, electronic storage 24, external resources 26, and/or other components of system 10 wirelessly and/or via wires.

The one or more processors that may be included in controller 20 may be configured to provide information processing capabilities in system 10. The one or more processors may include one or more of a digital processor, an analog processor, a digital circuit designed to process information, an analog circuit designed to process information, a state machine, and/or other mechanisms for electronically processing information. In some implementations, the one or more processors may be a single processing unit and/or may include a plurality of processing units. These processing units may be physically located within the same device (e.g., a computer that is part of external resources 26), or the processors may represent processing functionality of a plurality of devices operating in coordination (e.g., additive manufacturing device 12, controller 20). In some implementations, the processors may be configured to execute one or more computer program components.

User Interface 22 may be configured to provide an interface between system 10 and the user through which the user may provide information to and receive information from system 10. This enables data, cues, results, and/or instructions and any other communicable items, collectively referred to as "information," to be communicated between the user and system 10. Examples of interface devices suitable for inclusion in user interface 22 include a touch screen, a keypad, touch sensitive and/or physical buttons, switches, a keyboard, knobs, levers, a display, speakers, a microphone, an indicator light, a printer, and/or other interface devices. In some implementations, user interface 22 includes a plurality of separate interfaces. In some implementations, user interface 22 includes at least one interface that is provided integrally with controller 20, additive manufacturing device 12, casting mold fabrication device 16, and/or other components of system 10. In some implementations, user interface 22 may be included in a computing device (e.g., a desktop computer, a laptop computer, a tablet computer, a smartphone, etc.) included in external resources 26.

It is to be understood that other communication techniques, either hard-wired or wireless, are also contemplated by the present disclosure as user interface 22. For example, the present disclosure contemplates that user interface 22 may be integrated with a removable storage interface provided by electronic storage 24. In this example, information may be loaded into system 10 from removable storage (e.g., a smart card, a flash drive, a removable disk) that enables the user to customize the implementation of system 10. Other exemplary input devices and techniques adapted for use with system 10 as user interface 22 include, but are not limited to, an RS-232 port, RF link, an IR link, modem (telephone, cable or other). In short, any technique for communicating information with system 10 is contemplated by the present disclosure as user interface 22.

Electronic storage 24 may comprise electronic storage media that electronically stores information. The electronic storage media of electronic storage 24 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 24 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 24 may store software algorithms (e.g., mold positive fabrication algorithms), processing information (e.g., material and/or process parameters for fabricating the mold positive and/or the casting mold), information used by controller 20, and/or other information that enables system 10 to function properly. Electronic storage 24 may be (in whole or in part) a separate component within system 10, or electronic storage 24 may be provided (in whole or in part) integrally with one or more other components of system 10 (e.g., controller 20).

External resources 26 may include sources of information (e.g., an electronic material property database, a process parameter database), one or more servers outside of system 10, a network (e.g., the internet), electronic storage, equipment related to Wi-Fi technology, equipment related to Bluetooth® technology, data entry devices, sensors, scanners, computing devices associated with individual users, and/or other resources. In some implementations, some or all of the functionality attributed herein to external resources 26 may be provided by resources included in system 10. External resources 26 may be configured to communicate with controller 20, additive manufacturing device 12, casting mold fabrication device 16, and/or other components of system 10 via wired and/or wireless connections, via a network (e.g., a local area network and/or the internet), via cellular technology, via Wi-Fi technology, and/or via other resources. For example, a remotely located user may provide fabrication instructions to additive manufacturing device 12 to form the mold positive.

Figure 3:
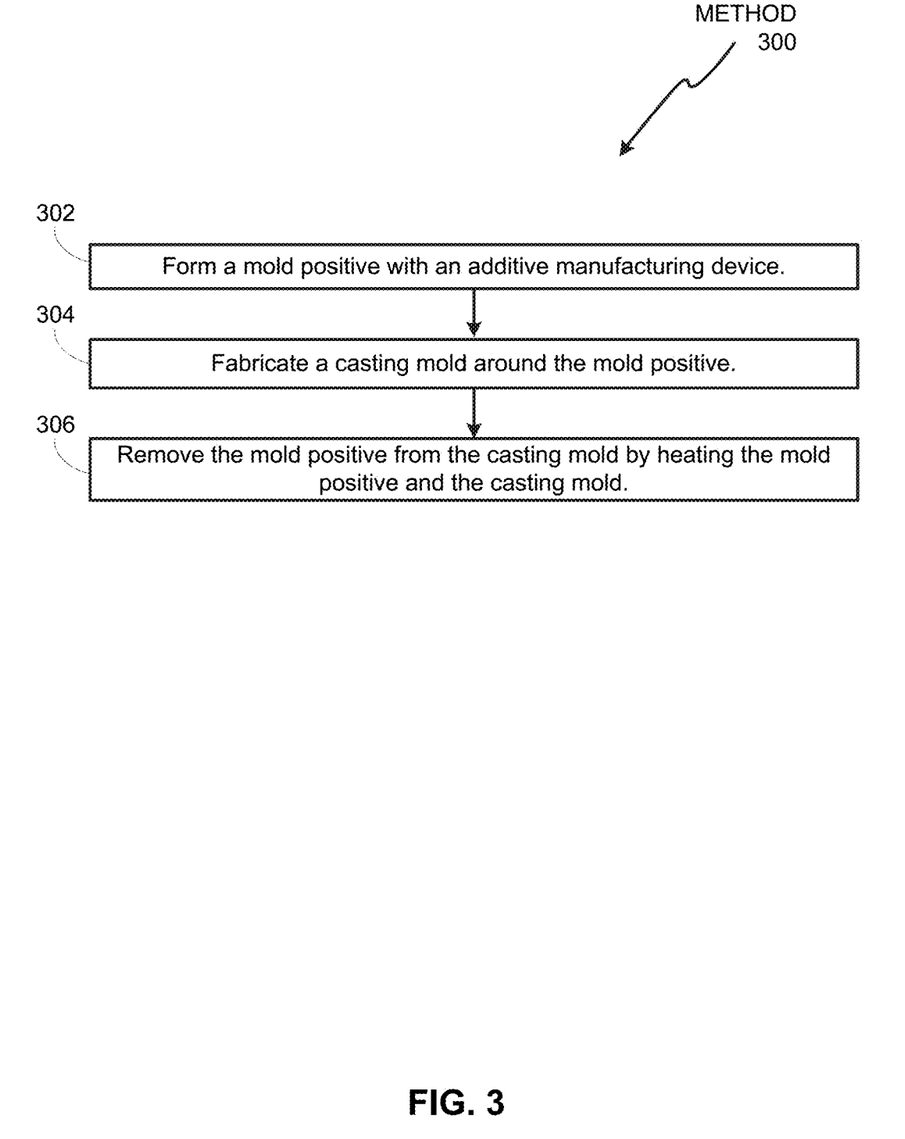
FIG. 3 illustrates a method for using a mold positive fabricated from a solid to gas phase change material via additive manufacturing to form a casting mold.

FIG. 3 illustrates a method 300 of using a mold positive to form a casting mold. The operations of method 300 presented below are intended to be illustrative. In some implementations, method 300 may be accomplished with one or more additional operations not described, and/or without one or more of the operations discussed. Additionally, the order in which the operations of method 300 are respectively illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, the mold positive may be formed with an additive manufacturing device. The mold positive may be formed from a material having a first portion that undergoes a solid to gas phase transformation at a first temperature and a second portion that undergoes a solid to gas phase transformation at a second temperature. The first portion may be formed within the second portion. In some implementations, the first temperature is between about 150° C. and about 350° C. In some implementations, the first temperature is about 180° C. In some implementations, the first temperature is about 320° C. The first temperature may be low relative to the second temperature. In some implementations, the first portion may be one or both of an additive and/or a filler. In some implementations, the first portion and the second portion may lack metallic elements. In some implementations, the first portion includes urea, and/or isocyanurate, and/or other components. In some implementations, the second portion includes one or more of polyethylene glycol, a polyester based monomer, PEG400, PEG200, and/or other components. In some implementations, the second portion has a ratio of carbon to oxygen of 2n:n+1, and/or other ratios. In some implementations, one or more of the first portion or the second portion includes one or more of a pigment or a dye to control light behavior during additive manufacturing photopolymerization to moderate cure depth and cure rate, for example. Operation 302 may be performed by an additive manufacturing device that is the same as or similar to additive manufacturing device 12 (shown in FIG. 1 and described herein).

At an operation 304, the casting mold may be fabricated around the mold positive. Operation 304 may be performed by a casting mold fabrication device the same as or similar to casting mold fabrication device 16 (shown in FIG. 1 and described herein).

At an operation 306, the mold positive may be removed from the casting mold by heating the mold positive and the casting mold. The temperature of the mold positive and the casting mold may be increased from below the first temperature to above the second temperature. This heating may cause the first portion to undergo the solid to gas phase transformation at the first temperature, thereby forming voids in the second portion. The voids may facilitate expansion of the second portion without damaging the casting mold. The second portion may expand as the temperature increases and then undergo the solid to gas phase transformation at the second temperature, leaving the casting mold empty and ready for casting. In some implementations, the first portion and the second portion may be configured such that undergoing the solid to gas phase transformation includes thermally decomposing into one or more of $CO_2$, $H_2O$, Ammonia, and/or other components. In some implementations, the first portion and the second portion may be formed with a quantity of double bonds that facilitates reduced soot production and/or complete combustion during the solid to gas phase transformation. In some implementations, the first portion and the second portion include oxygen that forms hydroxyl radicals during the solid to gas phase transformation to facilitate substantially complete combustion of the first portion and the second portion in the absence of externally supplied oxygen. Operation 306 may be performed by a computer processor component the same as or similar to parameter component 54 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method of using a mold positive to form a casting mold, the method comprising:
    forming the mold positive using an additive manufacturing device, the mold positive formed from a material having a first portion that undergoes a solid to gas phase transformation at a first temperature and a second portion that undergoes a solid to gas phase transformation at a second temperature, wherein the first portion is formed within the second portion, and wherein the first temperature is low relative to the second temperature;
    fabricating the casting mold around the mold positive; and
    removing the mold positive from the casting mold by increasing a temperature of the mold positive and the casting mold from below the first temperature to above the second temperature such that:
    the first portion undergoes the solid to gas phase transformation at the first temperature thereby forming voids in the second portion, the voids facilitating expansion of the second portion without damaging the casting mold, and
    the second portion expands as the temperature increases and then undergoes the solid to gas phase transformation at the second temperature leaving the casting mold empty and ready for casting.

2. The method of claim 1, wherein the first portion and the second portion are configured such that undergoing the solid to gas phase transformation includes thermally decomposing into one or more of CO2, H2O, or Ammonia.

3. The method of claim 1, wherein the first portion is one or both of an additive and/or a filler.

4. The method of claim 1, wherein the first portion and the second portion are formed with a quantity of double bonds that facilitates reduced soot production and/or complete combustion during the solid to gas phase transformation.

5. The method of claim 1, wherein the first portion and the second portion lack metallic elements.

6. The method of claim 1, wherein the first portion and the second portion include oxygen that forms hydroxyl radicals during the solid to gas phase transformation to facilitate substantially complete combustion of the first portion and the second portion in the absence of externally supplied oxygen.

7. The method of claim 1, wherein the first portion includes urea.

8. The method of claim 7, wherein the first temperature is about 180° C.

9. The method of claim 1, wherein the first portion includes isocyanurate and the first temperature is about 320° C.

10. The method of claim 1, wherein the second portion includes one or more of polyethylene glycol, a polyester based monomer, PEG400, or PEG200.

11. The method of claim 1, wherein the second portion has a ratio of carbon to oxygen of $2n:n+1$.

12. The method of claim 1, wherein one or more of the first portion or the second portion includes one or more of a pigment or a dye to control light behavior during additive manufacturing photopolymerization to moderate cure depth and cure rate.

13. A mold positive, the mold positive comprising:
a first portion formed of material that undergoes a solid to gas phase transformation at a first temperature; and
a second portion formed of material that undergoes a solid to gas phase transformation at a second temperature, wherein the first temperature is low relative to the second temperature, and wherein the first portion is formed within the second portion such that,
responsive to the temperature of the mold positive being increased from below the first temperature to above the second temperature, the first portion undergoes the solid to gas phase transformation at the first temperature to form voids in the second portion, the voids configured to facilitate expansion of the second portion just before the second portion undergoes the solid to gas phase transformation as the mold positive reaches the second temperature.

14. The mold positive of claim 13, wherein the first portion and the second portion are configured such that undergoing the solid to gas phase transformation includes thermally decomposing into one or more of $CO_2$, $H_2O$, or Ammonia.

15. The mold positive of claim 13, wherein the first portion is one or both of an additive and/or a filler.

16. The mold positive of claim 13, wherein the first portion and the second portion are formed with a quantity of double bonds that facilitates reduced soot production and/or complete combustion during the solid to gas phase transformation.

17. The mold positive of claim 13, wherein the first portion and the second portion lack metallic elements.

18. The mold positive of claim 13, wherein the first portion and the second portion include oxygen that forms hydroxyl radicals during the solid to gas phase transformation to facilitate substantially complete combustion of the first portion and the second portion in the absence of externally supplied oxygen.

19. The mold positive of claim 13, wherein the first portion includes urea.

20. The mold positive of claim 19, wherein first temperature is about 180° C.

21. The mold positive of claim 13, wherein the first portion includes isocyanurate and the first temperature is about 320° C.

22. The mold positive of claim 13, wherein the second portion includes one or more of polyethylene glycol, a polyester based monomer, PEG400, or PEG200.

23. The mold positive of claim 13, wherein the second portion has a ratio of carbon to oxygen of $2n:n+1$.

24. The mold positive of claim 13, wherein one or more of the first portion or the second portion includes one or more of a pigment or a dye to control light behavior during additive manufacturing photopolymerization to moderate cure depth and cure rate.

* * * * *